United States Patent Office 3,285,519
Patented Nov. 15, 1966

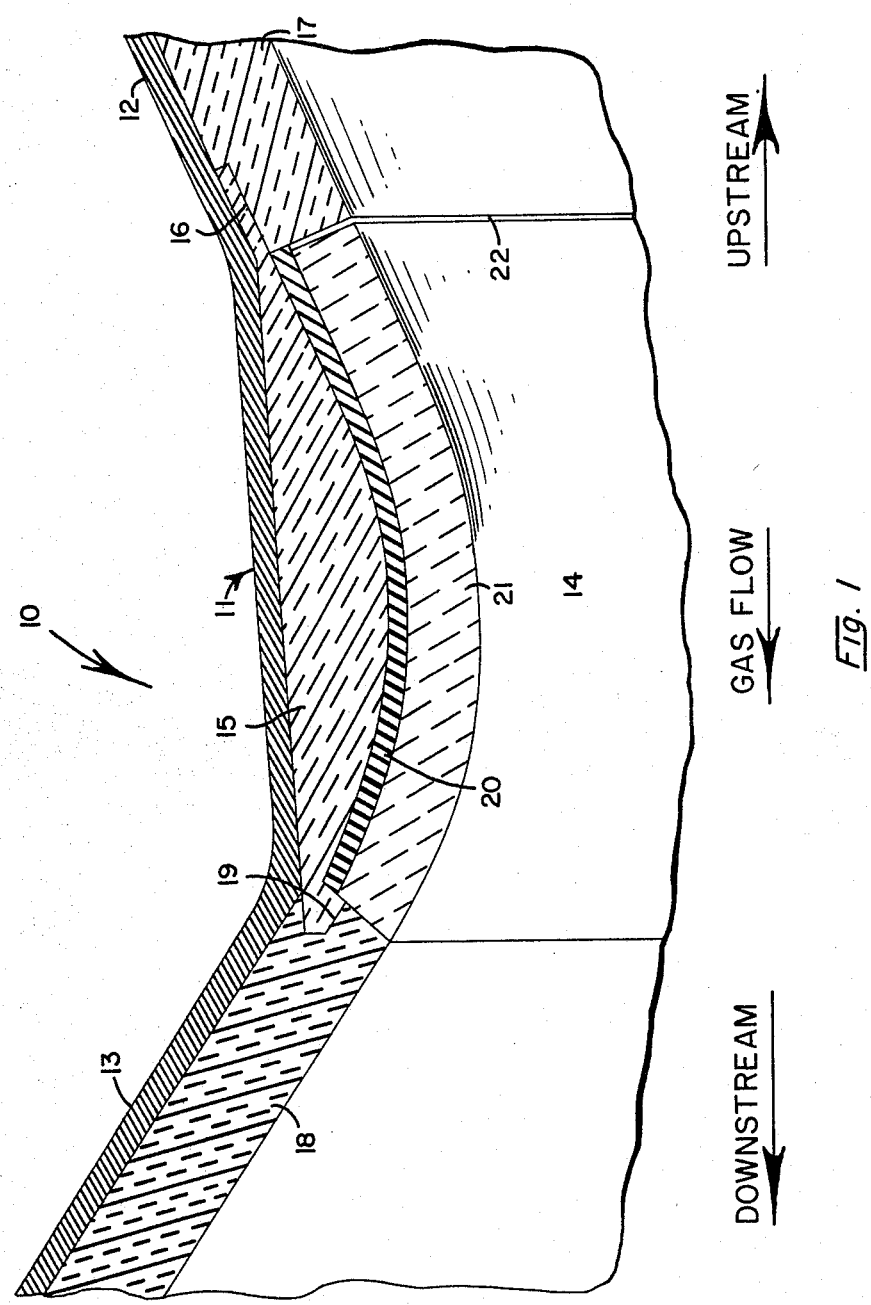

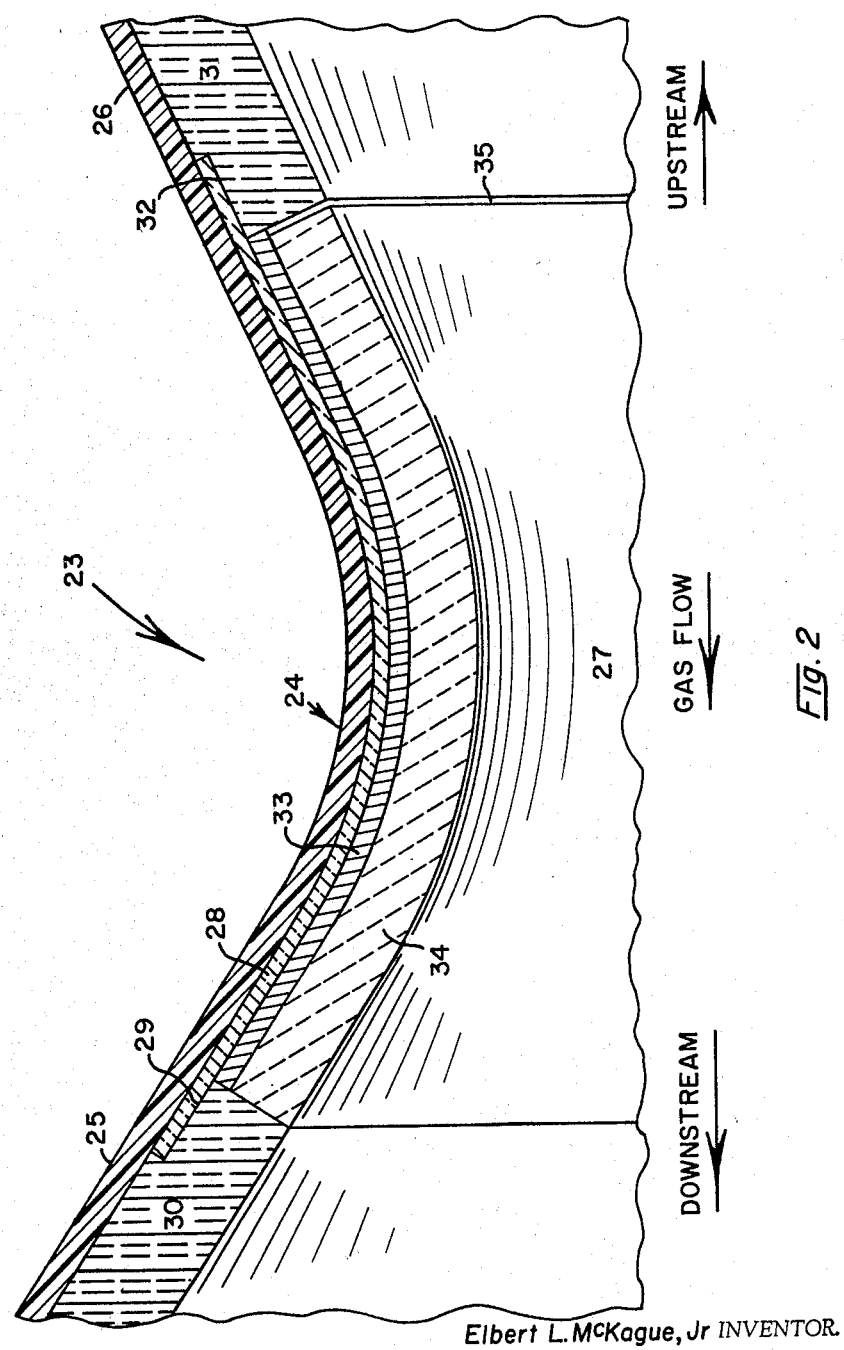

3,285,519
FREE EXPANDING DISPLACEABLE THROAT INSERT FOR A NOZZLE ASSEMBLY OF A SOLID PROPELLANT ROCKET MOTOR
Elbert L. McKague, Jr., St. Simons Island, Ga., assignor to Thiokol Chemical Corporation, Bristol, Pa., a corporation of Delaware
Filed Oct. 5, 1964, Ser. No. 401,299
10 Claims. (Cl. 239—265.15)

This invention relates to improvements in nozzle throat inserts for the nozzles of solid propellant rocket motors and, more particularly, to a displaceable support for such inserts.

Current emphasis on solid propellant motors requires a critical examination of component designs as well as consideration of solid propellant characteristics and ballistic parameters. Although a great deal of experience has been gained in conventional solid propellant rocket motors, many motor systems will require new design concepts. Problems connected with the design of a lightweight and high performance nozzle will be more severe than problems that arise when weight and performance are less critical. Such problems will be materially increased if the proposed design requires the use of a refractory material in the throat region to satisfy performance requirements.

At the present time, throat inserts made of graphite and having bloated cross-sectional shapes are used in both plastic and steel nozzle assemblies; and it has been determined that the heat input to and heat dispersion characteristics of such throat inserts is such that the temperature of the graphite can reach 5000° F. after short periods of motor operation. The graphite, at such a high temperature, will have a large radial expansion which, depending on the size of the insert, may be approximately one-half inch or more. Radial expansion of this magnitude can create serious problems of compatibility between the structural shell of the nozzle and the throat insert. It would be difficult to provide an adequate and reliable system to sustain the loads induced by this expansion while such expansion is occurring unless the weight of the components used is large, particularly since the anisotropy and bloated cross-sectional shape of the insert produce complex and frequently failing stresses with the insert. If such large weight is not permissible, such loads would result in failure of the nozzle assembly and subsequent malfunction of the rocket motor. For many materials which experience strength degradation with temperature increases, even larger weights are inadequate to prevent failure from occurring. However, since increased weight in the nozzle assembly would be an operational penalty and since low reliability is unacceptable, the present invention was conceived to reduce thermally induced stresses while, at the same time, also reducing the weight penalty and improving reliability. The present invention further provides the means of utilizing, as throat inserts, those materials which, though highly resistant to erosion, are unsuitable as currently applied by reason of reductions in physical strengths with temperature increases below the levels required to resist stresses induced by thermal expansion.

Thus, some of the problems to be solved by the present invention are the reduction of thermally-induced stresses and reduction of weight with the subsequent provision of a lightweight and reliable nozzle. In order to provide such a nozzle, the invention contemplates the use of a thin-walled, erosion-resistant throat insert for a plastic or steel supported nozzle wherein the throat insert has a displaceable support. The use, therefore, of a thin-walled throat insert that is made of a conductive, erosion-resistant material, such as graphite, will result in improved performance if the present invention is followed.

It is an object of the invention, therefore, to provide a nozzle throat insert that is supported by and separated from the nozzle structural shell by a fusible material which will soften and be extruded into the exhaust stream flowing through the nozzle by means of the thermal expansion of the throat insert, as the temperature thereof increases under the influence of the heat generated by the exhaust stream.

Structural support of the insert during the initial portion of motor operation will be provided by the structural shell with the cool, fusible material transmitting pressure-induced strains from the insert, whereas pressure generation within the softened, fusible material, after heating to the melting point, will provide support. Thus a light and reliable nozzle will result since neither the weight of the throat insert nor the weight of the nozzle shell will have to be increased to resist forces generated by the thermal expansion of the throat insert and since failing stresses will be diminished.

With the above and other objects and advantages in view, the invention consists of the novel details of construction, arrangement, and combination of parts more fully hereinafter described, claimed, and illustrated in the accompanying drawings in which:

FIGURE 1 illustrates a partial longitudinal sectional view depicting a nozzle assembly constructed in accordance with the present invention, and wherein the structural member of the nozzle is a metal, and FIGURE 2 is a view similar to FIGURE 1 wherein the structural member of the nozzle is a plastic.

Referring more in detail to the drawings wherein like parts are designated by like reference numerals, the reference numeral 10 is used in FIGURE 1 to designate, as a whole, one form of a nozzle assembly embodying the invention.

The nozzle assembly 10 includes a suitable structural metal shell 11 which conforms to nozzles of conventional shape and which may vary in size according to the size of the motor case with which it is associated.

The basic material from which the structural shell 11 of this form of the invention may be fabricated is steel; however, its manner of construction is not important since it may be fabricated by any practical method in use at the present time. The nozzle assembly 10, as depicted in FIGURE 1, is typified by the shape of its internal profile and is commonly known as a De Laval nozzle having a converging portion 12 that is upstream as to the flow of gasses from the combustion chamber through the structural shell 11 and a diverging portion 13 that is downstream as to the flow of gasses from the combustion chamber with the point of demarcation between the two portions being the throat area 14.

To solve the problem of structural incompatibility of the nozzle assembly 10 resulting from thermal expansion, it is necessary to construct the nozzle assembly of FIGURE 1 in the following manner.

Position on the interior surface of the throat area 14 so that the opposite ends thereof terminate within the confines of the converging portion 12 and the diverging portion 13, a layer of insulating material 15. The insulating material 15 should have a very low thermal conductivity and may be a fiber-reinforced phenolic, such as phenolic-impregnated asbestos fiber material; and it is to be used to protect the structural shell 11 from reaching damaging temperatures.

Positioned on the interior surface of the converging portion 12 in overlapping relation to that edge of the insulating material 15 that terminates within the confines of the converging portion 12 by reason of cutout 16 is an erosion-resistant convergent liner 17. There is also positioned on the interior surface of the diverging portion 13 an erosion-resistant divergent liner 18, and this liner overlaps the opposite terminal edge of the insulating material 15 within the confines of the diverging portion 13 by reason of a cutout 19. The inner edges of the liners 17 and 18 can be said to outline the throat area 14, and a metal support 20 is positioned on the insulating material 15 with one edge thereof in contact with the inner edge of the liner 17 and the opposite edge thereof in contact with that portion of the insulating material 15 that is positioned in the cutout 19 in the liner 18.

A graphite throat insert 21 is then positioned on the support 20 in contact therewith; and it will be noted that the insulating material 15, support 20, and throat insert 21 all conform to the conventional curvature of the structural shell 11 at the throat portion 14 thereof. The edge of the throat insert 21 adjacent to the inner edge of the liner 18 is in abutting relation thereto and the two edges are bonded together. The opposite edge of the throat insert 21 is spaced from the inner edge of the liner 17 to provide an annular vent 22. The vent 22 extends to the support 20 and communicates with that area which is located between the throat insert 21 and the insulating material 15 which, as previously described and shown, is occupied by the support 20. The entire assembly is then properly processed by any conventional bonding and curing method to retain all of the component parts thereof in fixed rigid relation to each other, and the steel structural shell 11 prevents the structural failure of the component parts positioned therein by limiting all strains induced thereon by pressurization.

The nozzle assembly 10 may also be assembled by bonding the liners 17 and 18 in place, as previously described, within the structural shell 11. The sub-assembly consisting of the insulating material 15, support 20 and throat insert 21 may be bonded together as a unit exteriorly of the structural shell 11; then the sub-assembly may be inserted into the structural shell 11 with the opposite ends of the insulating material 15 in the cutouts 16 and 19, as previously described, and then be positively retained therein by any of the conventional methods, as previously referred to, wherein the nozzle assembly 10 is assembled as previously described.

Referring more in detail to FIGURE 2, the reference numeral 23 is used in this figure to designate, as a whole, another form of a nozzle assembly embodying the invention.

The nozzle assembly 23 includes a suitable structural plastic shell 24 which conforms to nozzles of conventional shape and which may vary in size according to the size of the motor case with which it is associated.

The basic material from which the structural shell 24 of this form of the invention may be fabricated is plastic; however, its manner of construction is not important since it may be fabricated by any practical method in use at the present time. The nozzle assembly 23, as depicted in FIGURE 2, is also typified by the shape of its internal profile and is commonly known as a De Laval nozzle having a converging portion 26 that is upstream as to the flow of gases from the combustion chamber through the structural shell 24 and a diverging portion 25 that is downstream as to the flow of gases from the combustion chamber with the point of demarcation between the two portions being the throat area 27.

To solve the problem of structural incompatibility of the nozzle assembly 23 resulting from thermal expansion, it is necessary to construct the nozzle assembly of FIGURE 2, wherein a plastic structural shell 24 is utilized, in the following manner:

Position on the interior surface of the throat area 27 so that the opposite ends thereof terminate within the confines of the converging portion 26 and the diverging portion 25, a layer of insulating material 28. The insulating material 28 should have a very low thermal conductivity and may be a fiber-reinforced phenolic, such as phenolic-impregnated asbestos fiber material; and it is to be used to protect the structural shell 24 from reaching damaging temperatures.

Positioned on the interior surface of the converging portion 26 in overlapping relation to that edge of the insulating material 28 that terminates within the confines of the converging portion 26 by reason of cutout 32 is an erosion-resistant convergent liner 31. There is also positioned on the interior surface of the diverging portion 25 an erosion-resistant divergent liner 30, and this liner overlaps the opposite terminal edge of the insulating material 28 within the confines of the divergent portion 25 by reason of a cutout 29. The inner edges of the liners 30 and 31 can be said to outline the throat area 27, and a metal support 33 is positioned on the insulating material 28 with the opposite edges thereof in contact with the inner edges of the liners 30 and 31.

A graphite throat insert 34 is then positioned on the support 33 in contact therewith; and it will be noted that the insulating material 28, support 33, and throat insert 34 all conform to the conventional curvature of the structural shell 23 at the throat portion 27 thereof. The edge of the throat insert 34 adjacent to the inner edge of the liner 30 is in abutting relation thereto and the two edges are bonded together. The opposite edge of the throat insert 34 is spaced from the inner edge of the liner 31 to provide an annular vent 35. The vent 35 extends to the support 33 and communicates with that area which is located between the throat insert 34 and the insulating material 28 which, as previously described and shown, is occupied by the support 33. The entire assembly is then properly processed by any conventional bonding and curing method to retain all of the component parts thereof in fixed rigid relation to each other, and the plastic structural shell 24 prevents the structural failure of the component parts positioned therein by limiting all strains induced thereon by pressurization.

The nozzle assembly 23 may also be assembled by bonding the liners 30 and 31 in place, as previously described, within the structural shell 24. The sub-assembly, consisting of the insulating material 28, support 33 and throat insert 34 may be bonded together as a unit exteriorly of the structural shell 24, then the sub-assembly may be inserted into the structural shell 24 with the opposite ends of the insulating material 28 in the cutouts 29 and 32, as previously described, and then be positively retained therein by any of the conventional methods, as previously referred to, wherein the nozzle assembly 23 is assembled, as previously described.

The foregoing structures, as outlined, provide a support for the throat insert, with the support consisting of a material which will transmit initial pressure loads to the structural shell while, at the same time, permitting free thermal expansion of the throat insert by volumetric displacement of the support when the support is melted by heating. The support will, therefore, at its surface, contact with the throat insert, cover such surface entirely and be of a material which is solid at room temperature but will become liquid in the lower region of the temperature range creating normal expansion of the throat insert.

The material from which the supports 20 and 33 are fabricated must, therefore, have a comparatively low melting point. It must also possess a low value for the ratio of melting point to the product of specific heat and density for the throat inserts 21 and 34 for the supports 20 and 33 will thus provide a heat sink which will reduce the maximum temperature reached in the throat inserts 21 and 34 to thus reduce the radial expansion of the graphite material from which the throat inserts 21 and 34 are fabricated.

Tin has been found to be one of the best types of material used for making the supports 20 and 33. It has a melting point of 450° F. and its value for the product of the inherent specific heat and density is approximately 0.0145 B.t.u./in./3° F.

The layer of tin used for the supports 20 and 33 will, therefore, have a thickness determined by the amount of radial expansion that is expected to occur for the throat inserts 21 and 34 under normal operating conditions. If it is assumed that the heat sink characteristics of the tin can limit the maximum temperature of the graphite inserts 21 and 34 to 4000° F., then the thickness of the tin required would be approximately 0.33 inch for an insert having a 6-inch inside diameter. For example, a heat transfer analysis was conducted to determine the ultimate temperature the graphite inserts 21 and 34 would reach after 100 seconds of motor operation. If the graphite used was one inch thick and the tin was 0.33 inch thick, the temperature of the graphite would vary between 3900° F. and 4000° F.

Therefore, under such temperature conditions and considering the melting point of the tin, thermal expansion of the graphite will force the tin outwardly through the vents 22 and 35 into the high pressure region in the nozzle to be dispersed from the nozzle exit or be consumed under the temperature conditions existing in the nozzle.

The operational procedures that exist when the present invention is in use are as follows: Ignition of the rocket motor causing full chamber operating pressure. The load caused by the pressure on the throat inserts 21 and 34 will be transmitted through the supports 20 and 33 to the structural shells 11 and 24 which may be fabricated to only support the graphite under existing load conditions.

As the rocket motor continues to operate, the heat of the graphite will continue to increase until the melting point of the tin has been reached. Then, when the radial thermal expansion of the graphite is sufficient to act on the melted tin, the force of expansion of the graphite will cause the melted tin to flow through the vents 22 and 35 until the pressure in the support areas created by the expansion of the graphite is equal to the pressure at the vent openings.

Once the graphite has started to heat up, the thermal expansion, thereof, will increase rapidly so that the supports 20 and 33, as they reach the liquid stage will be rapidly forced outwardly of the vents into the exhaust stream flowing through the nozzle. During the sequence of the preceding events of operation, the structural shells 11 and 24 will only be subjected to normal motor operating pressures and will not have to withstand the additional pressure load created by the thermal expansion of the graphite, nor will complex stresses be generated within the graphite which could cause cracking and failure.

The venting of the liquid tin to the inside of the nozzle can be easily accomplished by leaving a gap between the throat inserts 21 and 34 and the liners 17 and 30, thus providing the vents 22 and 35. If the contacting edges of the throat inserts 21 and 34 and the liners 18 and 31 have sealed butt joints, such joints will alone limit the escape of the liquid tin to the vents 22 and 35.

Pressure distribution in the nozzle will exert a compressive force at the joint areas between the throat inserts 21 and 34 and the liners 18 and 31 so that, even though the bonded joints may be destroyed by the existing temperatures, the compressive forces will maintain leak-proof joints during the operation of the rocket motor.

The invention is not to be limited as to size, since size is not a major problem in the operation of the invention. Graphite has been suggested for the fabrication of the invention because, at the present time, it is the best commonly-used material that is available for the erosion-resistance that is required in the throat area. Other material, however, as found may be used providing they will supply adequate erosion-resistance and will significantly expand under extreme heat conditions. Tin has also been suggested, but its use is not restricted if other metals are found that will possess the same or superior characteristics of tin, as previously set forth.

There has thus been provided a free-expanding displaceable support throat that will provide the lowest possible nozzle weight that can be obtained, permit the use of the most erosion-resistant material that can be used for the throat insert and permit the fabrication of a nozzle assembly that can be fabricated by a layer-on-layer build-up or by any other conventional techniques to permit excellent control of the quality, tolerances and weight of the assembly to provide the most efficient nozzle assembly under existing conditions; and it is believed that the sequence of the steps of fabrication and the results obtained thereby will be clear to those skilled in the art as well as the understanding that changes in the minor details of construction, arrangement and combination of parts may be resorted to without departing from the spirit of the invention and the scope of the appended claims.

Having thus described the invention, what is claimed as new and desired to be secured by Letters Patent is:

1. A free-expanding displaceable throat insert for a nozzle assembly for the exhaust stream of a solid propellant rocket motor comprising a nozzle having converging and diverging portions with a throat portion therebetween and joining said first two portions into a unit, a layer of insulating material positioned on the inside of said throat portions, liners positioned on the inside of said converging and diverging portions with the opposing edges of said liners in overlapping relation to the opposite edges of said layer of insulating material, a metal support means that will melt under the influence of the heat generated by the exhaust stream positioned on said layer of insulating material with the opposite edges thereof in abutting relation to the opposed edges of said liners, and a throat insert positioned on said support means with one edge thereof in abutting relation to the edge of the liner positioned on said diverging portion and the opposite end thereof spaced from the edge of the liner positioned on said converging portion to provide a vent communicating with that area occupied by said support means, whereby when said support means has melted and said throat insert has expanded under the influence of the heat generated by the exhaust stream, the expansion of said throat insert will force said melted support means outwardly of said vent into the exhaust stream flowing through said nozzle.

2. A freely expanding displaceable-support throat insert for a nozzle assembly for the exhaust stream of a solid propellant rocket motor comprising a structural shell having converging and diverging portions with a throat portion therebetween and joining said first two portions into a unit, a throat insert positioned in said throat portion, a metallic support means that will melt under the influence of the heat generated by the exhaust stream positioned around and in contact with said throat insert, liners positioned adjacent to said throat insert and metallic support means in said converging and diverging portions with one edge of said throat insert positioned in abutting relation to the edge of the liner positioned on said diverging portion and the opposite end thereof spaced from the edge of the liner positioned on said converging portion to provide a vent communicating with that area occupied by said support means, whereby when said support means has melted and said throat insert has expanded under the influence of the heat generated by the exhaust stream, the expansion of said throat insert will force said melted support means outwardly of said vent into the exhaust stream flowing through said nozzle, a layer of insulating material positioned around said metallic support means and in overlapping relation to adjacent ends of said converging and diverging liners, and said structural shell encasing all of said components into a unitary nozzle assembly.

3. A nozzle assembly for the exhaust stream of a rocket motor comprising a structural shell having converging and diverging portions and a throat portion intermediate of said first two portions, a layer of insulating material on said throat portion, liners on said converging and diverging portions, a metal support means that will melt under the influence of the heat generated by the exhaust stream on said layer of insulating material, and a throat insert on said support means having one edge thereof spaced from one edge of one of said liners to provide a vent therebetween, whereby when said support means has melted and said throat insert has expanded under the influence of the heat generated by the exhaust stream, the expansion of said throat insert will force said melted support means outwardly of said vent into the exhaust stream flowing through said nozzle.

4. A nozzle asssembly, as in claim 3, wherein the liners for said converging and diverging portions are made from an erosion-resistant material.

5. A nozzle assembly, as in claim 3, wherein the structural shell is metal.

6. A nozzle assembly, as in claim 3, wherein said throat insert is graphite having a thickness of approximately one inch and said support is tin having a thickness of approximately 0.33 inch.

7. A nozzle assembly, as in claim 3, wherein said support means is made from a metal having a comparatively low melting point.

8. A nozzle assembly, as in claim 7, wherein said metal is tin.

9. A nozzle assembly, as in claim 8, wherein said tin is approximately 0.33 inch in thickness.

10. A nozzle assembly, as in claim 3, wherein said throat insert is made of an erosion-resistant, thermally-expanding material having uniform wall thickness.

References Cited by the Examiner

UNITED STATES PATENTS

| 2,835,107 | 5/1958 | Ward | 60—35.6 |
| 2,987,874 | 6/1961 | Nicholson | 60—35.6 |
| 3,133,411 | 5/1964 | McCorkle | 60—35.6 |
| 3,157,026 | 11/1964 | Lampert | 60—35.6 |
| 3,167,909 | 2/1965 | Thielman | 60—35.6 |

EVERETT W. KIRBY, *Primary Examiner.*